US012763261B2

(12) United States Patent
Onodera

(10) Patent No.: US 12,763,261 B2
(45) Date of Patent: Oct. 13, 2026

(54) ELECTRONIC COMPONENT

(71) Applicant: TDK CORPORATION, Tokyo (JP)

(72) Inventor: Shinya Onodera, Tokyo (JP)

(73) Assignee: TDK CORPORATION, Tokyo (JP)

( * ) Notice: Subject to any disclaimer, the term of this patent is extended or adjusted under 35 U.S.C. 154(b) by 126 days.

(21) Appl. No.: 18/762,710

(22) Filed: Jul. 3, 2024

(65) Prior Publication Data

US 2025/0069812 A1 Feb. 27, 2025

(30) Foreign Application Priority Data

Aug. 23, 2023 (JP) ................................ 2023-135287

(51) Int. Cl.
*H01G 4/30* (2006.01)
*H01G 4/008* (2006.01)
*H01G 4/012* (2006.01)
*H01G 4/12* (2006.01)
*H01G 4/232* (2006.01)

(52) U.S. Cl.
CPC ............... *H01G 4/30* (2013.01); *H01G 4/008* (2013.01); *H01G 4/012* (2013.01); *H01G 4/12* (2013.01); *H01G 4/2325* (2013.01)

(58) Field of Classification Search
CPC .......... H01G 4/30; H01G 4/008; H01G 4/012; H01G 4/12; H01G 4/2325
See application file for complete search history.

(56) References Cited

U.S. PATENT DOCUMENTS

2009/0323253 A1* 12/2009 Kobayashi ............. H01G 4/005 427/79
2013/0250480 A1* 9/2013 Ahn ....................... H01G 4/129 156/89.12
2016/0086733 A1* 3/2016 Saito .................... H01G 4/1227 205/183
2019/0385795 A1* 12/2019 Yang ........................ H01G 4/30
2021/0043378 A1 2/2021 Nagai et al.
2022/0122777 A1* 4/2022 Kang ................... H01G 4/2325
2022/0172898 A1* 6/2022 Lee ........................ H01G 4/012
2023/0178302 A1* 6/2023 Yi .......................... H01G 4/008

FOREIGN PATENT DOCUMENTS

JP H05-144665 A 6/1993
JP 2010-034503 A 2/2010
KR 10-2021-0018048 A 2/2021

* cited by examiner

*Primary Examiner* — Michael P Mcfadden
(74) *Attorney, Agent, or Firm* — Oliff PLC

(57) ABSTRACT

An electronic component includes an element body and an external electrode disposed on the element body. The external electrode includes a conductive resin layer. The conductive resin layer includes a silver. The electronic component includes an oxide disposed in front of an end edge of the conductive resin layer. The oxide is in contact with the element body.

21 Claims, 9 Drawing Sheets

ELECTRONIC COMPONENT

CROSS-REFERENCE TO RELATED APPLICATIONS

This application is based upon and claims the benefit of priority from Japanese Patent Application No. 2023-135287, filed on Aug. 23, 2023, the entire contents of which are incorporated herein by reference.

BACKGROUND

Field

The present disclosure relates to an electronic component.

Description of the Related Art

Known electronic components include an element body and an external electrode on the element body (see, for example, Japanese Unexamined Patent Publication No. H5-144665). The external electrode includes, for example, a conductive resin layer and a metal plating layer outside the conductive resin layer.

SUMMARY

The conductive resin layer includes, for example, a plurality of silver particles and a resin. In a configuration in which the external electrode includes the conductive resin layer, silver migration may occur in the external electrode. The silver migration is considered to occur due to the following events, for example.

Electric field or heat acts on the conductive resin layer, and the silver particle is ionized. The silver particle included in the conductive resin layer may be ionized under influence of oxygen. Generated silver ion is attracted by electric field between the external electrodes and migrates from the conductive resin layer. The electric field acting on the silver particle includes, for example, electric field between the external electrodes or electric field between the external electrode and an internal conductor in the element body. The silver ion migrating from the conductive resin layer react with, for example, an electron supplied from the internal conductor or the external electrode, and is deposited as silver on a surface of the element body.

One aspect of the present disclosure provides an electronic component preventing progress of silver migration.

An electronic component according to one aspect of the present disclosure includes an element body and an external electrode on the element body. The external electrode includes a conductive resin layer including a plurality of silver particles and a metal plating layer disposed outside the conductive resin layer with a gap between the metal plating layer and the element body. The electronic component according to the one aspect described above includes an oxide of a metal component included in the metal plating layer. The oxide is in contact with the metal plating layer and the element body and is disposed in the gap between the metal plating layer and the element body.

In the one aspect described above, the oxide is in contact with the metal plating layer and the element body and is disposed in the gap between the metal plating layer and the element body. Therefore, even when silver migration occurs in the conductive resin layer, progress of silver migration is prevented. The one aspect described above prevents the progress of silver migration on the element body.

The oxide in contact with the metal plating layer and the element body and disposed in the gap between the metal plating layer and the element body includes the oxide of the metal component included in the metal plating layer. Therefore, in the one aspect described above, the oxide is reliably disposed in the gap between the metal plating layer and the element body.

In the one aspect described above, the metal plating layer may include a copper plating layer. The oxide may include an oxide of copper included in the copper plating layer.

In a configuration in which the oxide includes an oxide of copper included in the copper plating layer, the oxide may be formed from heat treating the copper plating layer. Therefore, the oxide may be easily disposed.

In the one aspect described above, the metal plating layer may include an other metal plating layer different from the copper plating layer, the other metal plating layer being disposed outside the copper plating layer with a gap between the other metal plating layer and the element body.

In a configuration in which the metal plating layer includes the other metal plating layer, the other metal plating layer has the gap between the other metal plating layer and the element body. Heat tends to act on the copper plating layer through the gap between the other metal plating layer and the element body when heat-treating the copper plating layer, for example. Therefore, even in the configuration in which the metal plating layer includes the other metal plating layer, the oxide may be easily and reliably disposed.

In the one aspect described above, the other metal plating layer may include a nickel plating layer.

A configuration in which the other metal plating layer includes the nickel plating layer prevents solder leaching when solder-mounting.

In the one aspect described above, the other metal plating layer may include a solder plating layer outside the nickel plating layer.

A configuration in which the other metal plating layer includes the solder plating layer improves solder-mountability.

In the one aspect described above, the solder plating layer may have a gap between the solder plating layer and the element body.

In a configuration in which the solder plating layer has a gap between the solder plating layer and the element body, heat tends to act on the copper plating layer through the gap between the solder plating layer and the element body when heat-treating the copper plating layer, for example. Therefore, even in a configuration in which the metal plating layer includes the solder plating layer, the oxide may be easily and reliably disposed.

In the one aspect described above, the oxide may extend along an edge of the conductive resin layer.

A configuration in which the oxide extends along the edge of the conductive resin layer reliably prevents the progress of silver migration.

DETAILED DESCRIPTION

In the following description, with reference to the drawings, the same reference numbers are assigned to the same components or to similar components having the same function, and overlapping description is omitted.

Figure 1:
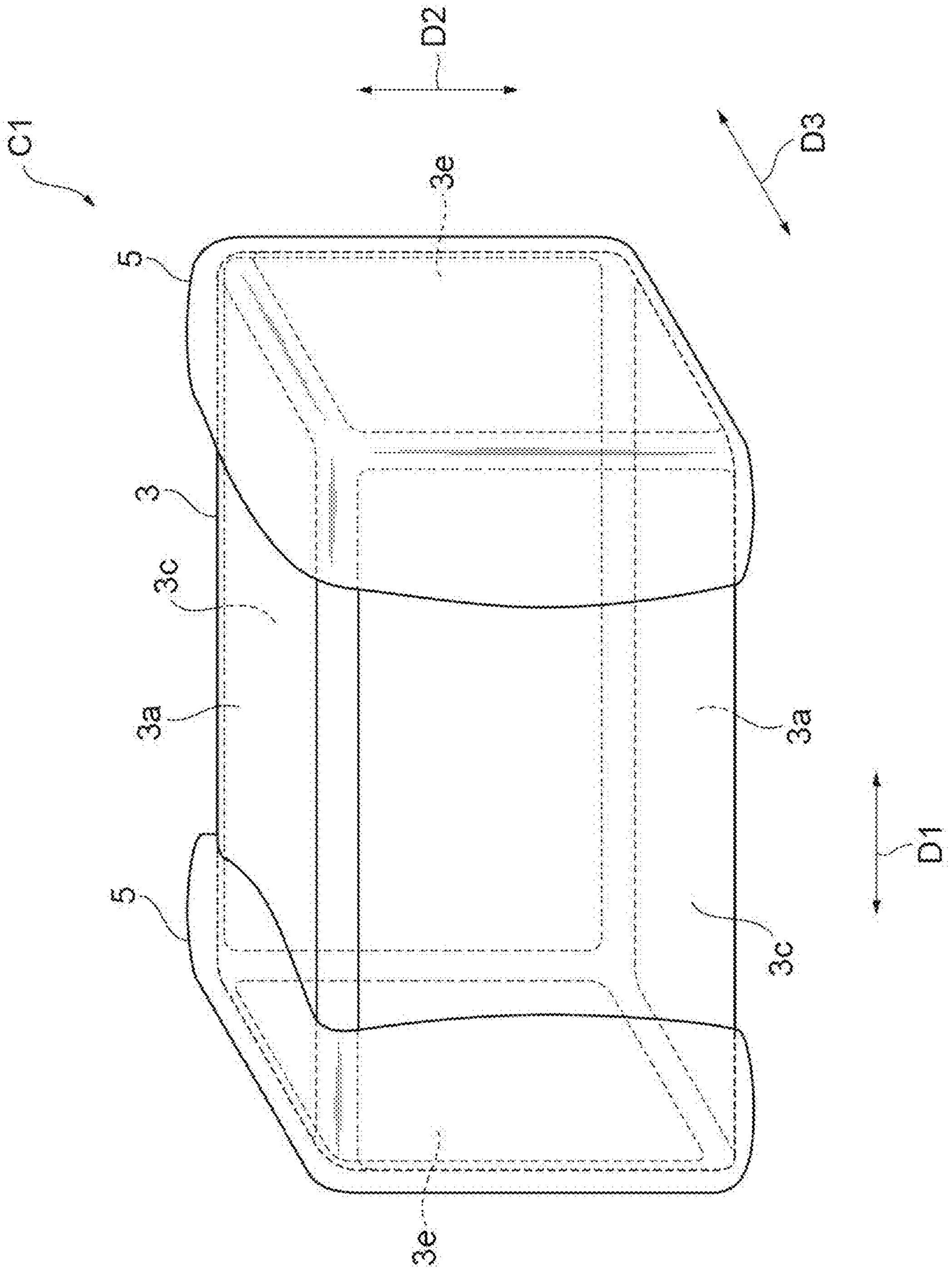
FIG. 1 is a perspective view of a multilayer capacitor according to an example.
Figure 2:
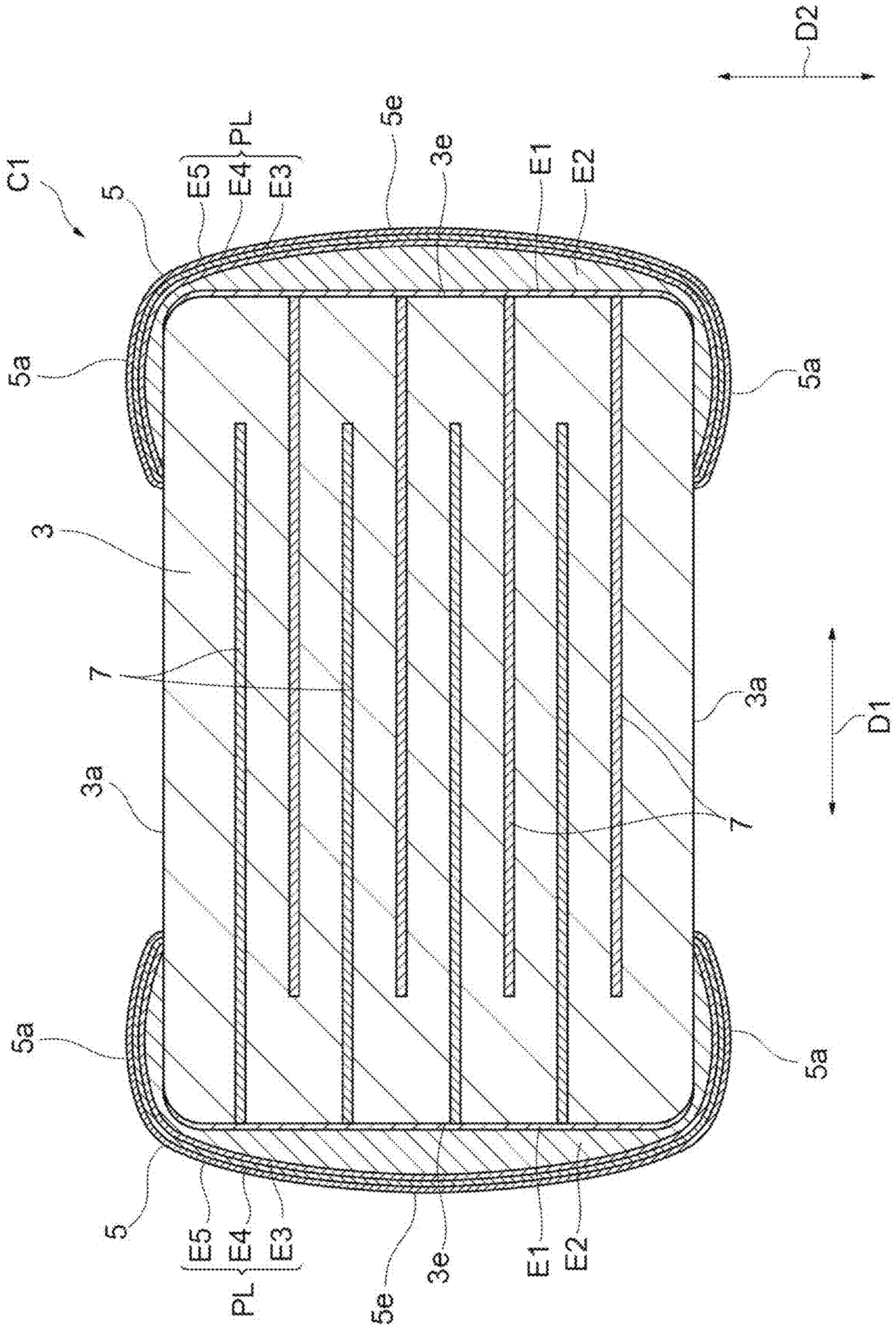
FIG. 2 is a view illustrating a cross-sectional configuration of the multilayer capacitor according to the example.
Figure 3:
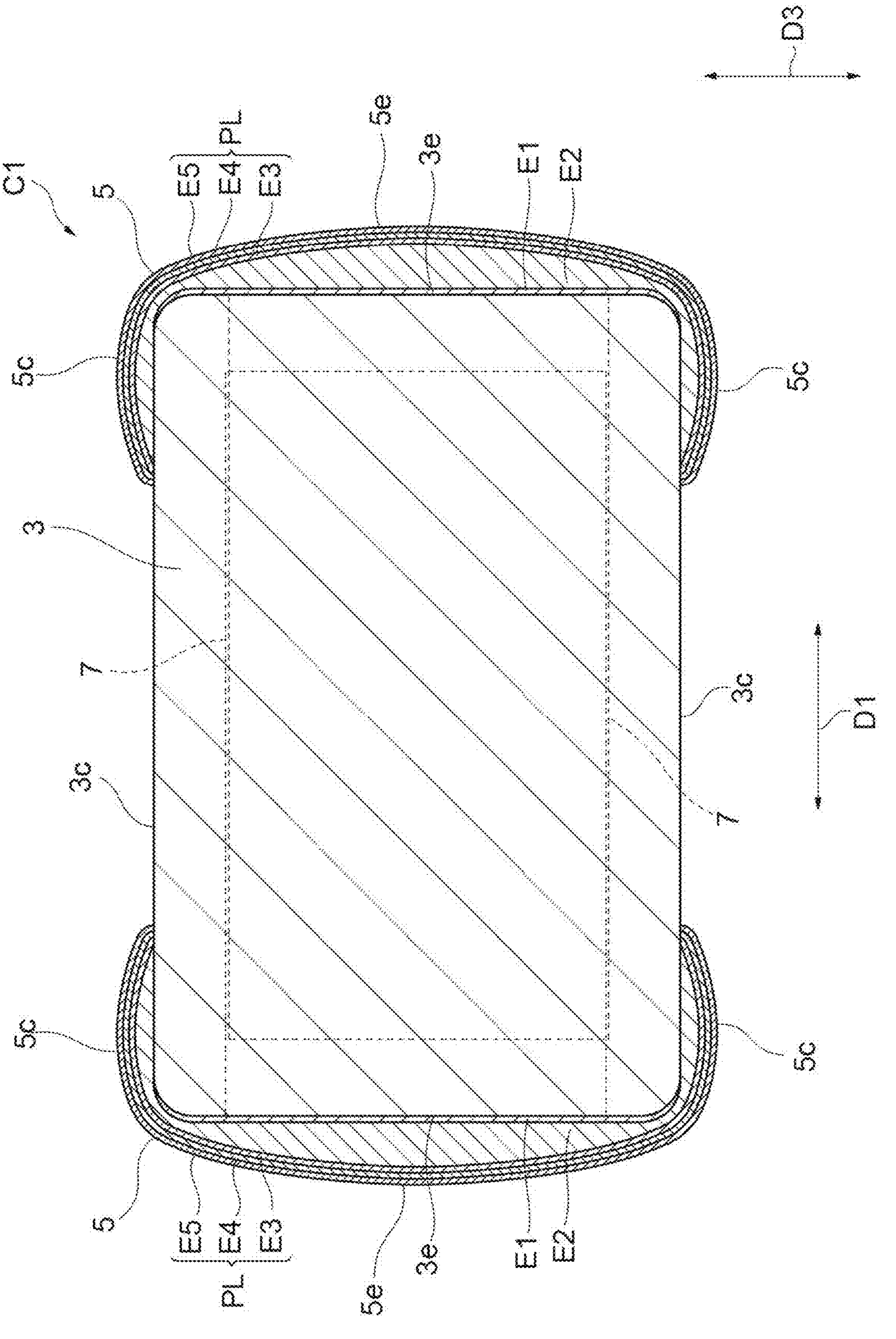
FIG. 3 is a view illustrating a cross-sectional configuration of the multilayer capacitor according to the example.
Figure 4:
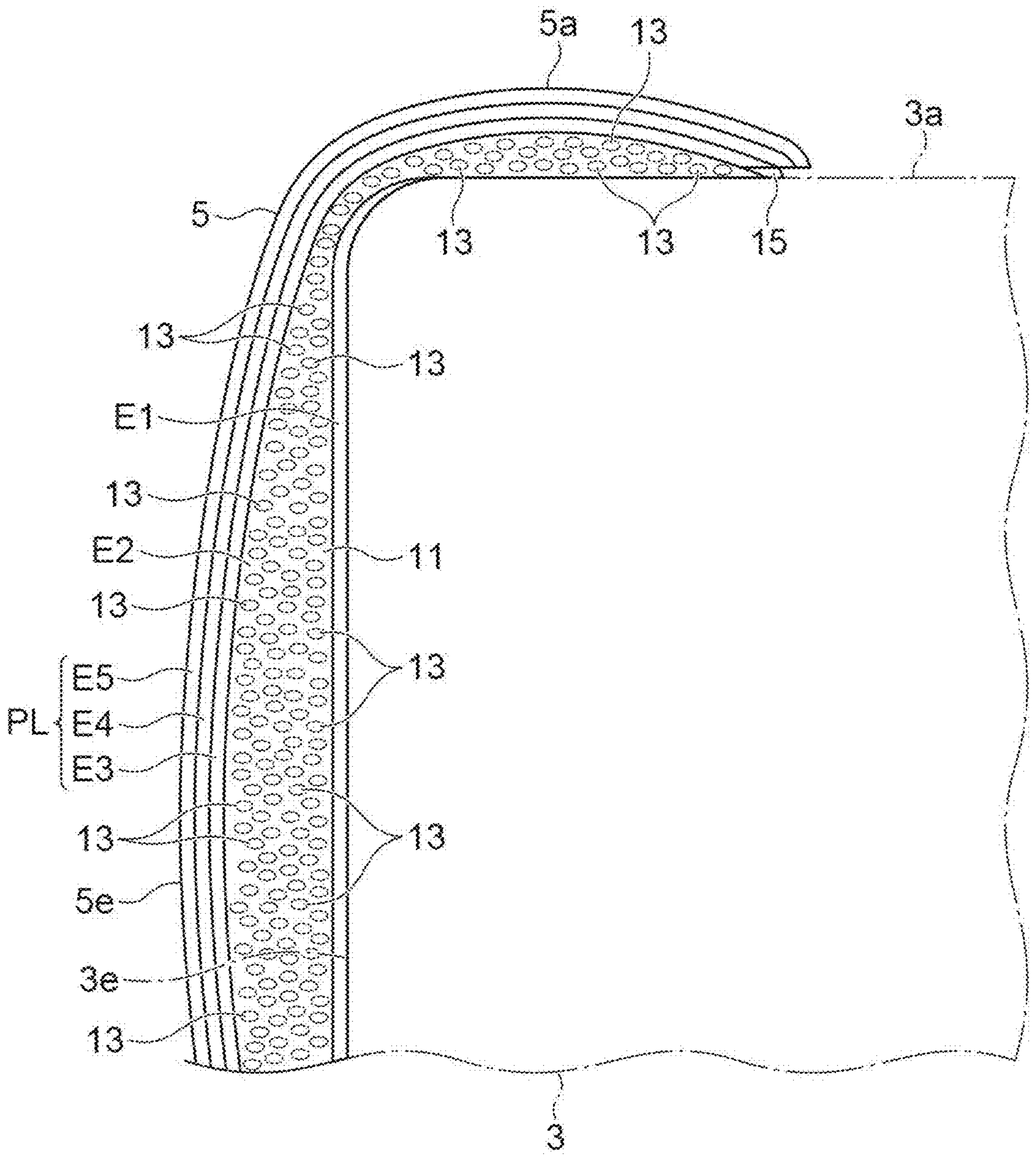
FIG. 4 is a view illustrating a cross-sectional configuration of an external electrode.
Figure 5:
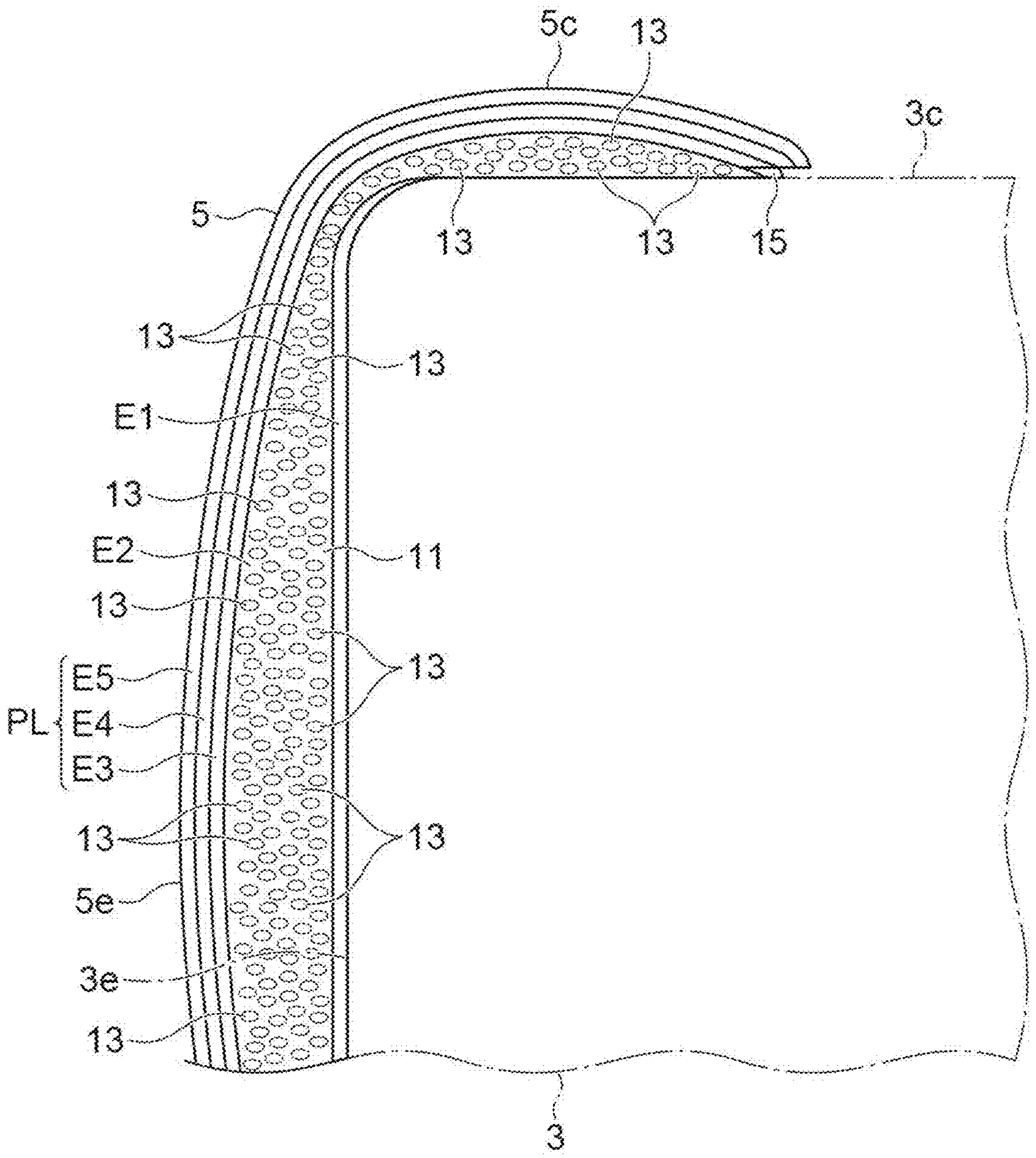
FIG. 5 is a view illustrating a cross-sectional configuration of the external electrode.
Figure 6:
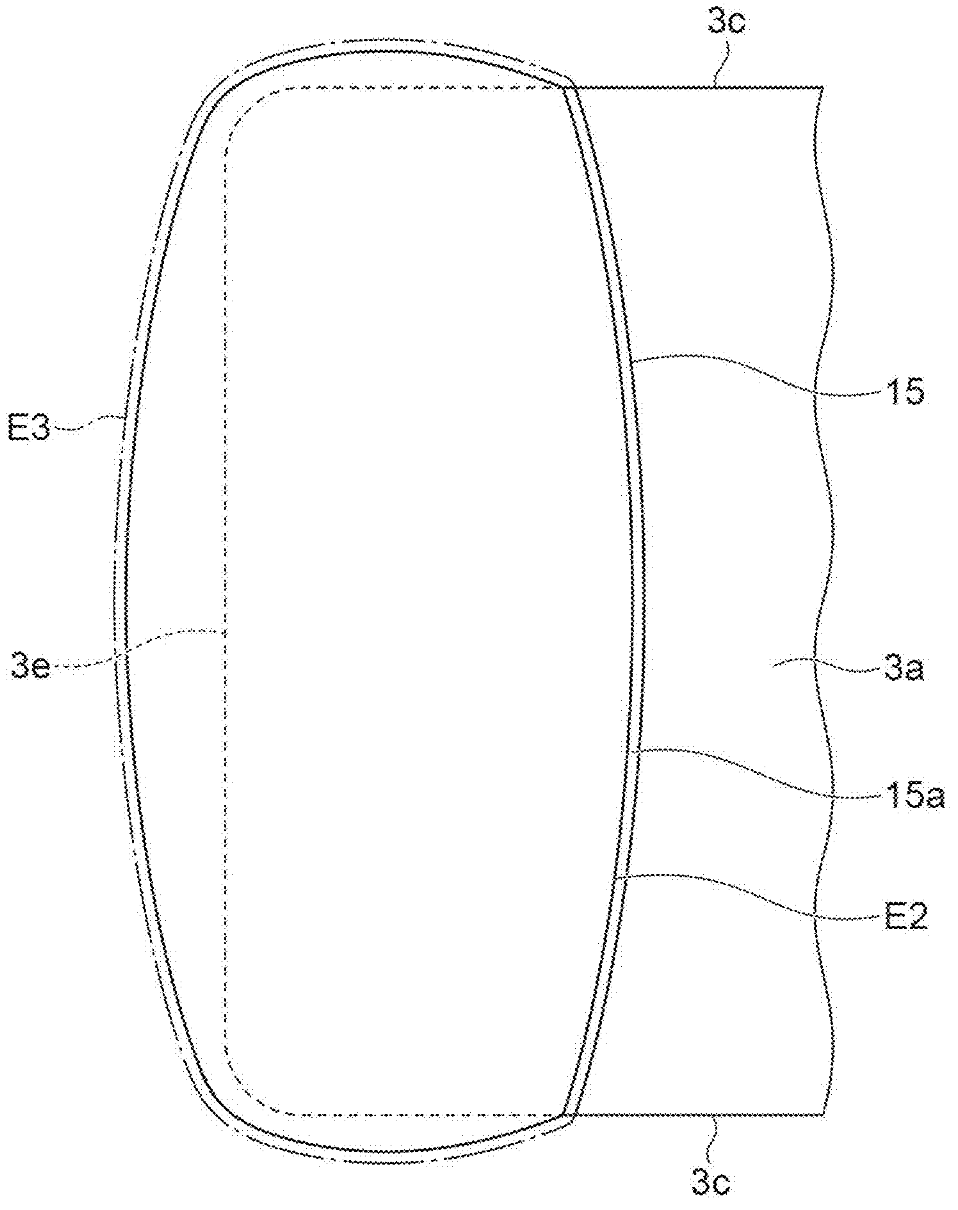
FIG. 6 is a plan view illustrating a second electrode layer and an oxide.
Figure 7:
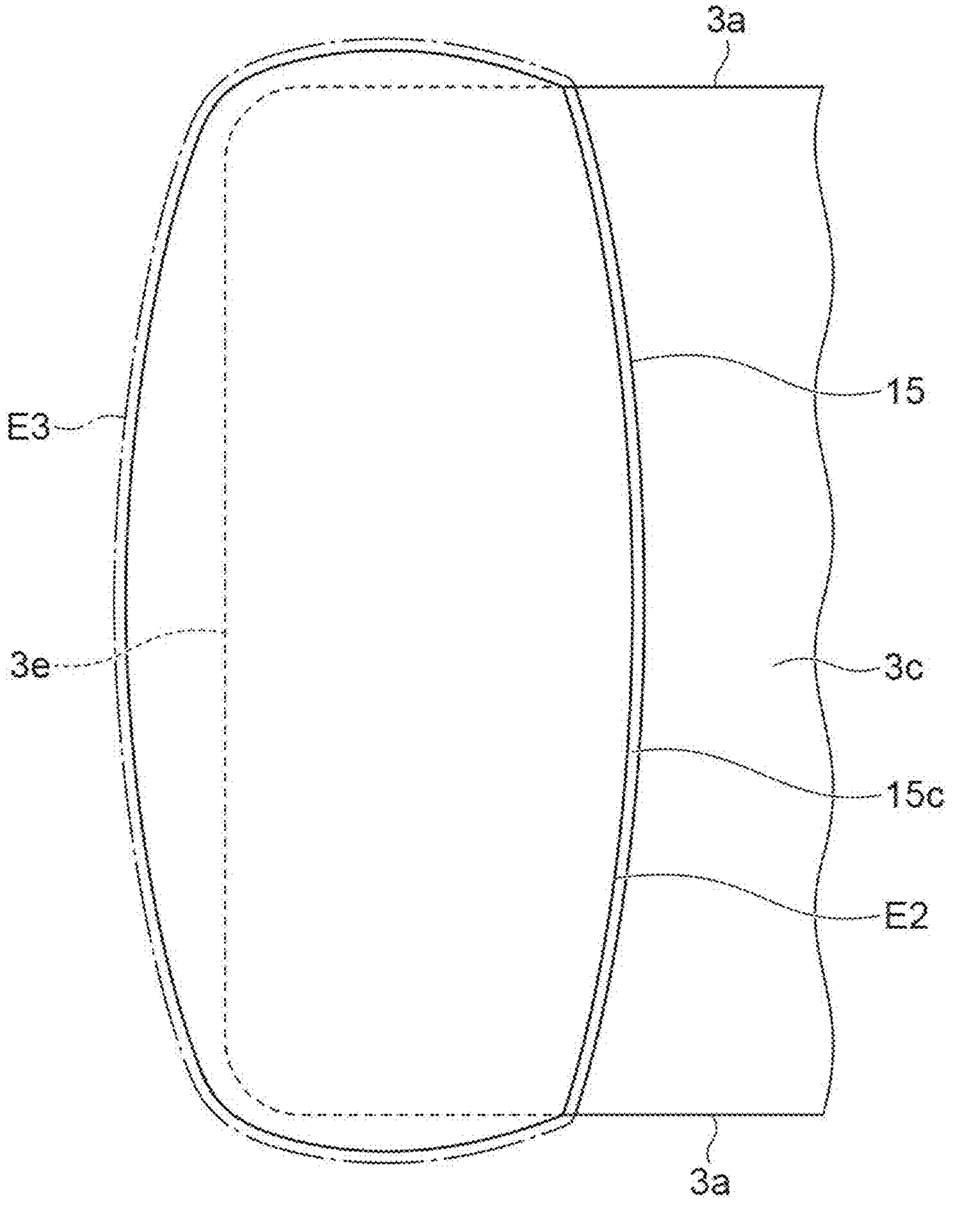
FIG. 7 is a plan view illustrating the second electrode layer and the oxide.

A configuration of a multilayer capacitor C1 according to the example will be described with reference to FIGS. 1 to 7. FIG. 1 is a perspective view of a multilayer capacitor according to the example. FIGS. 2 and 3 are views illustrating a cross-sectional configuration of the multilayer capacitor according to the example. FIGS. 4 and 5 are views illustrating a cross-sectional configuration of an external electrode. FIGS. 6 and 7 are plan views illustrating a second electrode layer and an oxide.

An electronic component includes, for example, the multilayer capacitor C1.

As illustrated in FIG. 1, the multilayer capacitor C1 includes an element body 3 of a rectangular parallelepiped shape, a plurality of external electrodes 5. For example, the multilayer capacitor C1 includes a pair of external electrodes 5. The pair of external electrodes 5 are disposed on an outer surface of the element body 3. The pair of external electrodes 5 are separated from each other. The rectangular parallelepiped shape includes a rectangular parallelepiped shape in which corners and ridges are chamfered, or a rectangular parallelepiped shape in which the corners and ridges are rounded.

The element body 3 includes a pair of side surfaces 3*a* opposing each other, a pair of side surfaces 3*c* opposing each other, and a pair of end surfaces 3*e* opposing each other. The pair of side surfaces 3*a*, the pair of side surfaces 3*c*, and the pair of end surfaces 3*e* each have a substantially rectangular shape. A direction in which the pair of side surfaces 3*a* oppose each other includes a direction D2. A direction in which the pain of side surfaces 3*c* oppose each other includes a direction D3. A direction in which the pair of end surfaces 3*e* oppose each other includes a direction D1.

The multilayer capacitor C1 is solder-mounted on an electronic device, for example. The electronic device includes, for example, a circuit board or an electronic component. In the multilayer capacitor C1, for example, one of the four side surfaces 3*a* and 3*c* opposes the electronic device. The one of the four side surfaces 3*a* and 3*c* is arranged to constitute a mounting surface. The one of the four side surfaces 3*a* and 3*c* includes the mounting surface. For example, the side surface 3*a* includes the mounting surface.

The direction D2 includes a direction orthogonal to the side surfaces 3*a*, and is orthogonal to the direction D3. The direction D1 includes a direction parallel to the side surfaces 3*a* and the side surfaces 3*c*, and is orthogonal to the direction D2 and the direction D3. The direction D3 includes a direction orthogonal to the side surfaces 3*c*, and the direction D1 includes a direction orthogonal to the end surfaces 3*e*. For example, a length of the element body 3 in the direction D1 is larger than a length of the element body 3 in the direction D2 and larger than a length of the element body 3 in the direction D3. The direction D1 includes a longitudinal direction of the element body 3. The length of the element body 3 in the direction D2 and the length of the element body 3 in the direction D3 may be equal to each other. The length of the element body 3 in the direction D2 and the length of the element body 3 in the direction D3 may be different from each other.

The length of the element body 3 in the direction D2 defines, for example, a height of the element body 3. The length of the element body 3 in the direction D3 defines, for example, a width of the element body 3. The length of the element body 3 in the direction D1 defines, for example, a longitudinal length of the element body 3. For example, the height of the element body 3 is 0.1 to 3.2 mm, the width of the element body 3 is 0.1 to 6.3 mm, and the longitudinal length of the element body 3 is 0.2 to 7.5 mm. For example, the height of the element body 3 is 2.5 mm, the width of the element body 3 is 2.5 mm, and the longitudinal length of the element body 3 is 3.2 mm.

The pair of side surfaces 3*a* extend in the direction D3 to couple the pair of side surfaces 3*c* to each other. The pair of side surfaces 3*a* also extend in the direction D1. The pair of side surfaces 3*c* extend in the direction D2 to couple the pair of side surfaces 3*a* to each other. The pair of side surfaces 3*c* also extend in the direction D1. The pair of end surfaces 3*e* extend in the direction D2 to couple the pair of side surfaces 3*a* to each other. The pair of end surfaces 3*e* also extend in the direction D3 to couple the pair of side surfaces 3*c* to each other.

The element body 3 includes a ridge portion between the end surface 3*e* and the side surface 3*a*, a ridge portion between the end surface 3*e* and the side surfaces 3*c*, and a ridge portion between the side surface 3*a* and the side surface 3*c*. For example, the ridge portions are rounded to be curved. For example, the element body 3 is subjected to what is called a round chamfering process. The end surface 3*e* and the side surface 3*a* are indirectly adjacent to each other with the ridge portion interposed between the end surface 3*e* and the side surface 3*a*. The end surface 3*e* and the side surface 3*c* are indirectly adjacent to each other with the ridge portion interposed between the end surface 3*e* and the side surface 3*c*. The side surface 3*a* and the side surface 3*c* are indirectly adjacent to each other with the ridge portion interposed between the side surface 3*a* and the side surface 3*c*.

The element body 3 is configured through laminating a plurality of dielectric layers in the direction D2. The element body 3 includes a plurality of laminated dielectric layers. In the element body 3, a lamination direction of the plurality of dielectric layers coincides with the direction D2. Each dielectric layer includes, for example, a sintered body of a ceramic green sheet containing a dielectric material. Examples of the dielectric material include dielectric ceramics. Examples of the dielectric ceramics include $BaTiO_3$-based, $Ba(Ti, Zr)O_3$-based, or $(Ba, Ca)TiO_3$-based dielectric ceramics. In the actual element body 3, each of the dielectric layers is integrated to such an extent that a boundary between the dielectric layers cannot be visually recognized.

As illustrated in FIGS. 2 and 3, the multilayer capacitor C1 includes a plurality of internal electrodes 7. Each of the internal electrodes 7 includes an internal conductor disposed in the element body 3. Each of the internal electrodes 7 is made of an electrically conductive material that is commonly used as an internal conductor of a multilayer electronic component. The electrically conductive material includes, for example, a base metal. The electrically conductive material includes, for example, nickel (Ni) or copper (Cu). Each of the internal electrodes 7 is configured as a sintered body of electrically conductive paste containing the electrically conductive material described above. For example, the internal electrodes 7 include nickel.

The plurality of internal electrodes 7 are disposed in different positions (layers) in the direction D2. The plurality of internal electrodes 7 are alternately disposed in the element body 3 to oppose each other in the direction D2 with an interval therebetween. The internal electrodes 7 adjacent to each other in the direction D2 have different polarities from each other. One end of the internal electrode 7 is exposed to a corresponding end surface 3*e* of the pair of end surfaces 3*e*. The internal electrode 7 includes one end exposed to the corresponding end surface 3*e*. The plurality of internal electrodes 7 include an internal electrode 7 exposed to one end surface 3*e* of the pair of end surfaces 3*e* and an internal electrode 7 exposed to the other end surface 3*e* of the pair of end surfaces 3*e*. The internal electrodes 7 exposed to the one end surface 3*e* and the internal electrodes 7 exposed to the other end surface 3*e* are alternately disposed in the direction D2. The plurality of internal electrodes 7 are disposed in the element body 3 to be distributed in the direction D2. Each of the plurality of internal electrodes 7 is located in a plane substantially parallel to the side surfaces 3*a*. A direction in which the internal electrodes 7 oppose each other, that is, the direction D2 is orthogonal to a direction parallel to the side surfaces 3*a*. The direction in which the internal electrodes 7 oppose each other is orthogonal to the directions D3 and D1.

In a configuration in which the lamination direction of the plurality of dielectric layers includes the direction D3, the plurality of internal electrodes 7 are disposed in different positions (layers) in the direction D3. In a configuration in which the lamination direction of the plurality of dielectric layers includes the direction D3, the internal electrodes 7 exposed to the one end surface 3*e* and the internal electrodes 7 exposed to the other end surface 3*e* are alternately disposed in the direction D3. Each of the plurality of internal electrodes 7 is located in a plane substantially parallel to the side surfaces 3*c*. The internal electrodes 7 oppose each other in the direction D3.

As illustrated in FIG. 1, the external electrodes 5 are disposed at both ends of the element body 3 in the first direction D1. Each external electrode 5 is disposed on a corresponding end surface 3*e* of the pair of end surfaces 3*e*. For example, each external electrode 5 is disposed on the pair of side surfaces 3*a*, the pair of side surfaces 3*c*, and the end surface 3*e*. The external electrode 5 includes a plurality of electrode portions 5*a*, 5*c*, and 5*e*, as illustrated in FIGS. 2 and 3. The electrode portion 5*a* is disposed on both the side surface 3*a* and the ridge portion between the side surface 3*a* and the end surface 3*e*. The electrode portion 5*c* is disposed on both the side surface 3*c* and the ridge portion between the side surface 3*c* and the end surface 3*e*. The electrode portion 5*e* is disposed on the end surface 3*e*. The external electrode 5 also includes an electrode portion disposed on the ridge portion between the side surface 3*a* and the side surface 3*c*.

Each external electrode 5 is formed on five surfaces of the pair of side surfaces 3*a*, the pair of side surfaces 3*c*, and the end surface 3*e* as well as the above-described ridge portions. The electrode portions 5*a*, 5*c*, and 5*e* adjacent to each other are coupled and are electrically connected to each other. The electrode portion 5*e* covers the entire one end of a corresponding internal electrodes 7 of the plurality of internal electrodes 7. The electrode portion 5*e* is directly connected to the corresponding internal electrode 7. The external electrode 5 is electrically connected to the corresponding internal electrode 7.

As illustrated in FIGS. 2 to 5, the external electrode 5 includes a first electrode layer E1, a second electrode layer E2, a third electrode layer E3, a fourth electrode layer E4, and a fifth electrode layer E5. The fifth electrode layer E5 includes the outermost layer of the external electrode 5. Each of the electrode portions 5*a*, 5*c*, and 5*e* includes the first electrode layer E1, the second electrode layer E2, the third electrode layer E3, the fourth electrode layer E4, and the fifth electrode layer E5.

The first electrode layer E1 of the electrode portion 5*a* is disposed on the ridge portion between the side surface 3*a* and the end surface 3*e*, and not disposed on the side surface 3*a*. The first electrode layer E1 of the electrode portion 5*a* covers the entire ridge portion between the side surface 3*a* and the end surface 3*e*. The first electrode layer E1 of the electrode portion 5*a* does not cover the side surface 3*a*. The first electrode layer E1 of the electrode portion 5*a* is in contact with the ridge portion between the side surface 3*a* and the end surface 3*e*. The side surface 3*a* is exposed from the first electrode layer E1. The first electrode layer E1 of the electrode portion 5*a* may be disposed on the side surface 3*a*. The first electrode layer E1 of the electrode portion 5*a* may cover a partial region of the side surface 3*a* and the entire ridge portion between the side surface 3*a* and the end surface 3*e*. The first electrode layer E1 of the electrode portion 5*a* may be in contact with the partial region of the side surface 3*a*. The partial region covered with the first electrode layer E1 of the electrode portion 5*a* may be positioned closer to the end surface 3*e*.

The second electrode layer E2 of the electrode portion 5*a* is disposed on both the first electrode layer E1 and the side surface 3*a*. In the electrode portion 5*a*, the second electrode layer E2 covers the entire first electrode layer E1 and a partial region of the side surface 3*a*. The second electrode layer E2 of the electrode portion 5*a* indirectly covers the ridge portion between the side surface 3*a* and the end surface 3*e* such that the first electrode layer E1 is positioned between the second electrode layer E2 and the element body 3. In the electrode portion 5*a*, the second electrode layer E2 is in direct contact with the first electrode layer E1. The partial region covered with the second electrode layer E2 of the electrode portion 5*a* is positioned closer to the end surface 3*e*. The side surface 3*a* is exposed from the second electrode layer E2 at the remaining region excluding the partial region covered with the second electrode layer E2. In the electrode portion 5*a*, the second electrode layer E2 is in direct contact with the side surface 3*a*. In the electrode portion 5*a*, the second electrode layer E2 directly covers the side surface 3*a*. The second electrode layer E2 of the electrode portion 5*a* is positioned on both the side surface 3*a* and the ridge portion between the side surface 3*a* and the end surface 3*e*.

The third electrode layer E3 of the electrode portion 5*a* is disposed on the second electrode layer E2. In the electrode portion 5*a*, the third electrode layer E3 covers the second electrode layer E2. In the electrode portion 5*a*, the third electrode layer E3 is in contact with the second electrode layer E2. In the electrode portion 5*a*, the third electrode layer E3 is in direct contact with the second electrode layer E2.

The fourth electrode layer E4 of the electrode portion 5*a* is disposed on the third electrode layer E3. In the electrode portion 5*a*, the fourth electrode layer E4 covers the third electrode layer E3. In the electrode portion 5*a*, the fourth electrode layer E4 is in contact with the third electrode layer E3. In the electrode portion 5*a*, the fourth electrode layer E4 is in direct contact with the third electrode layer E3.

The fifth electrode layer E5 of the electrode portion 5*a* is disposed on the fourth electrode layer E4. In the electrode portion 5*a*, the fifth electrode layer E5 covers the fourth electrode layer E4. In the electrode portion 5*a*, the fifth electrode layer E5 is in contact with the fourth electrode layer E4. In the electrode portion 5*a*, the fifth electrode layer E5 is in direct contact with the fourth electrode layer E4.

In the electrode portion 5*a*, the third electrode layer E3, the fourth electrode layer E4, and the fifth electrode layer E5 are not in contact with the side surface 3*a*. In the electrode portion 5*a*, the third electrode layer E3, fourth electrode layer E4, and fifth electrode layer E5 are disposed outside the second electrode layer E2 with a gap between the third electrode layer E3, fourth electrode layer E4, and fifth electrode layer E5 and the side surface 3*a*. That is, the third electrode layer E3, the fourth electrode layer E4, and the fifth electrode layer E5 are separated from the side surface 3*a* (element body 3). The fourth electrode layer E4 of the electrode portion 5*a* is disposed outside the third electrode layer E3 of the electrode portion 5*a*. The fifth electrode layer E5 of the electrode portion 5*a* is disposed outside the fourth electrode layer E4 of the electrode portion 5*a*. The third electrode layer E3, fourth electrode layer E4, and fifth electrode layer E5 of the electrode portion 5*a* are positioned on the side surface 3*a*.

The first electrode layer E1 of the electrode portion 5*c* is disposed on the ridge portion between the side surface 3*c* and the end surface 3*e*, and not disposed on the side surface 3*c*. The first electrode layer E1 of the electrode portion 5*c* covers the entire ridge portion between the side surface 3*c* and the end surface 3*e*. The first electrode layer E1 of the electrode portion 5*c* does not cover the side surface 3*c*. The first electrode layer E1 of the electrode portion 5*c* is in contact with the ridge portion between the side surface 3*c* and the end surface 3*e*. The side surface 3*c* is exposed from the first electrode layer E1. The first electrode layer E1 of the electrode portion 5*c* may be disposed on the side surface 3*c*. The first electrode layer E1 of the electrode portion 5*c* may cover a partial region of the side surface 3*c* and the entire ridge portion between the side surface 3*c* and the end surface 3*e*. The first electrode layer E1 of the electrode portion 5*c* may be in contact with the partial region of the side surface 3*c*. The partial region covered with the first electrode layer E1 of the electrode portion 5*c* may be positioned closer to the end surface 3*e*.

The second electrode layer E2 of the electrode portion 5*c* is disposed on both the first electrode layer E1 and the side surface 3*c*. In the electrode portion 5*c*, the second electrode layer E2 covers the entire first electrode layer E1 and a partial region of the side surface 3*c*. The second electrode layer E2 of the electrode portion 5*c* indirectly covers the ridge portion between the side surface 3*c* and the end surface 3*e* such that the first electrode layer E1 is positioned between the second electrode layer E2 and the element body 3. In the electrode portion 5*c*, the second electrode layer E2 is in direct contact with the first electrode layer E1. The partial region covered with the second electrode layer E2 of the electrode portion 5*c* is positioned closer to the end surface 3*e*. The side surface 3*c* is exposed from the second electrode layer E2 at the remaining region excluding the partial region covered with the second electrode layer E2. In the electrode portion 5*c*, the second electrode layer E2 is in direct contact with the side surface 3*c*. In the electrode portion 5*c*, the second electrode layer E2 directly covers the side surface 3*c*. The second electrode layer E2 of the electrode portion 5*c* is positioned on both the side surface 3*c* and the ridge portion between the side surface 3*c* and the end surface 3*e*.

The third electrode layer E3 of the electrode portion 5*c* is disposed on the second electrode layer E2. In the electrode portion 5*c*, the third electrode layer E3 covers the second electrode layer E2. In the electrode portion 5*c*, the third electrode layer E3 is in contact with the second electrode layer E2. In the electrode portion 5*c*, the third electrode layer E3 is in direct contact with the second electrode layer E2.

The fourth electrode layer E4 of the electrode portion 5*c* is disposed on the third electrode layer E3. In the electrode portion 5*c*, the fourth electrode layer E4 covers the third electrode layer E3. In the electrode portion 5*c*, the fourth electrode layer E4 is in contact with the third electrode layer E3. In the electrode portion 5*c*, the fourth electrode layer E4 is in direct contact with the third electrode layer E3.

The fifth electrode layer E5 of the electrode portion 5*c* is disposed on the fourth electrode layer E4. In the electrode portion 5*c*, the fifth electrode layer E5 covers the fourth electrode layer E4. In the electrode portion 5*c*, the fifth electrode layer E5 is in contact with the fourth electrode layer E4. In the electrode portion 5*c*, the fifth electrode layer E5 is in direct contact with the fourth electrode layer E4.

In the electrode portion 5*c*, the third electrode layer E3, the fourth electrode layer E4, and the fifth electrode layer E5 are not in contact with the side surface 3*c*. In the electrode portion 5*c*, the third electrode layer E3, fourth electrode layer E4, and fifth electrode layer E5 are disposed outside the second electrode layer E2 with a gap between the third electrode layer E3, fourth electrode layer E4, and fifth electrode layer E5 and the side surface 3*c*. That is, the third electrode layer E3, the fourth electrode layer E4, and the fifth electrode layer E5 are separated from the side surface 3*c* (element body 3). The fourth electrode layer E4 of the electrode portion 5*c* is disposed outside the third electrode layer E3 of the electrode portion 5*c*. The fifth electrode layer E5 of the electrode portion 5*c* is disposed outside the fourth electrode layer E4 of the electrode portion 5*c*. The third electrode layer E3, fourth electrode layer E4, and fifth electrode layer E5 of the electrode portion 5*c* are positioned on the side surface 3*c*.

The second electrode layer E2 of the electrode portion 5*c* may cover only a partial region of the ridge portion between the side surface 3*c* and the end surface 3*e* and only a partial region of the side surface 3*c*. The above-described partial region of the ridge portion between the side surface 3*c* and the end surface 3*e* is positioned closer to the side surface 3*a*, for example. The above-described partial region of the side surface 3*c* is positioned at a corner, of the side surface 3*c*, closer to the side surface 3*a* and the end surface 3*e*, for example. The electrode portion 5*c* may have the following configuration. The second electrode layer E2 of the electrode portion 5*c* indirectly covers the above-described partial region of the ridge portion between the side surface 3*c* and the end surface 3*e* such that the first electrode layer E1 is positioned between the second electrode layer E2 and the ridge portion between the side surface 3*c* and the end surface 3*e*. The second electrode layer E2 of the electrode portion 5*c* directly covers the above-described partial region of the side surface 3*c*. The second electrode layer E2 of the electrode portion 5*c* directly covers a partial region of a portion, of the first electrode layer E1, positioned on the ridge portion between the side surface 3*c* and the end surface 3*e*. The electrode portion 5*c* includes a region in which the first electrode layer E1 is exposed from the second electrode layer E2 and a region in which the first electrode layer E1 is covered with the second electrode layer E2.

The first electrode layer E1 of the electrode portion 5e is disposed on the end surface 3e. The first electrode layer E1 of the electrode portion 5e covers the entire end surface 3e. The first electrode layer E1 of the electrode portion 5e is in contact with the entire end surface 3e. In the electrode portion 5e, the first electrode layer E1 is in direct contact with the end surface 3e.

The second electrode layer E2 of the electrode portion 5e is disposed on the first electrode layer E1. In the electrode portion 5e, the second electrode layer E2 covers the first electrode layer E1. In the electrode portion 5e, the second electrode layer E2 is in direct contact with the first electrode layer E1. In the electrode portion 5e, the second electrode layer E2 indirectly covers the end surface 3e such that the first electrode layer E1 is positioned between the second electrode layer E2 and the end surface 3e. The second electrode layer E2 of the electrode portion 5e is positioned on the end surface 3e.

The third electrode layer E3 of the electrode portion 5e is disposed on the second electrode layer E2. In the electrode portion 5e, the third electrode layer E3 covers the second electrode layer E2. In the electrode portion 5e, the third electrode layer E3 is in contact with the second electrode layer E2. In the electrode portion 5e, the third electrode layer E3 is in direct contact with the second electrode layer E2. In the electrode portion 5e, the third electrode layer E3 is not in direct contact with the first electrode layer E1.

The fourth electrode layer E4 of the electrode portion 5e is disposed on the third electrode layer E3. In the electrode portion 5e, the fourth electrode layer E4 covers the third electrode layer E3. In the electrode portion 5e, the fourth electrode layer E4 is in contact with the third electrode layer E3. In the electrode portion 5e, the fourth electrode layer E4 is in direct contact with the third electrode layer E3.

The fifth electrode layer E5 of the electrode portion 5e is disposed on the fourth electrode layer E4. In the electrode portion 5e, the fifth electrode layer E5 covers the fourth electrode layer E4. In the electrode portion 5e, the fifth electrode layer E5 is in contact with the fourth electrode layer E4. In the electrode portion 5e, the fifth electrode layer E5 is in direct contact with the fourth electrode layer E4.

In the electrode portion 5e, the third electrode layer E3, the fourth electrode layer E4, and the fifth electrode layer E5 are disposed outside the second electrode layer E2. The fourth electrode layer E4 of the electrode portion 5e is disposed outside the third electrode layer E3 of the electrode portion 5e. The fifth electrode layer E5 of the electrode portion 5e is disposed outside the fourth electrode layer E4 of the electrode portion 5e. The third electrode layer E3, fourth electrode layer E4, and fifth electrode layer E5 of the electrode portion 5e are positioned on the end surface 3e.

The second electrode layer E2 of the electrode portion 5e may cover only a partial region of the end surface 3e. The above-described partial region of the end surface 3e is positioned closer to the side surface 3a, for example. The electrode portion 5c may have the following configuration. The second electrode layer E2 of the electrode portion 5e indirectly covers the above-described partial region of the end surface 3e such that the first electrode layer E1 is positioned between the second electrode layer E2 and the end surface 3e. The second electrode layer E2 of the electrode portion 5e directly covers only a partial region of a portion, of the first electrode layer E1, positioned on the end surface 3e. The electrode portion 5e includes a region in which the first electrode layer E1 is exposed from the second electrode layer E2 and a region in which the first electrode layer E1 is covered with the second electrode layer E2.

The first electrode layer E1 is formed from sintering electrically conductive paste applied onto the surface of the element body 3. The electrically conductive paste is applied onto the end surface 3e, the ridge portion between the side surface 3a and the end surface 3e, and the ridge portion between the side surface 3c and the end surface 3e. The first electrode layer E1 is formed to cover the end surface 3e, the ridge portion between the side surface 3a and the end surface 3e, and the ridge portion between the side surface 3c and the end surface 3e. The first electrode layer E1 is formed from sintering a metal component (metal particles) included in the electrically conductive paste. The first electrode layer E1 includes a sintered metal layer. The first electrode layer E1 includes the sintered metal layer formed on the element body 3. For example, the first electrode layer E1 includes a sintered metal layer made of copper. The first electrode layer E1 may include a sintered metal layer made of nickel. The first electrode layer E1 includes a base metal. The electrically conductive paste includes, for example, particles made of copper or nickel, a glass component, an organic binder, and an organic solvent. The first electrode layers E1 included in the electrode portions 5a, 5c, and 5e are formed integrally with each other.

The second electrode layer E2 is formed from curing electrically conductive resin paste applied onto the first electrode layer E1. The electrically conductive resin paste is applied onto the first electrode layer E1 and the partial regions of the side surfaces 3a and 3c. The second electrode layer E2 is formed on over the first electrode layer E1 and the element body 3. The electrically conductive resin paste includes, for example, a plurality of silver particles, a resin, and an organic solvent. The resin includes, for example, a thermosetting resin. The thermosetting resin is, for example, a phenol resin, an acrylic resin, a silicone resin, an epoxy resin, or a polyimide resin. The second electrode layer E2 is in contact with a part of the ridge portion between the side surface 3a and the side surface 3c. The second electrode layers E2 included in the electrode portions 5a, 5c, and 5e are integrally formed with each other.

The second electrode layer E2 includes a conductive resin layer covering the first electrode layer E1. As illustrated in FIGS. 4 and 5, the second electrode layer E2 includes a resin 11 and a plurality of silver particles 13. The plurality of silver particles 13 form conductive paths in the second electrode layer E2. FIGS. 4 and 5 schematically illustrate a cross-sectional configuration of the external electrode 5. In FIGS. 4 and 5, hatching indicating a cross section is omitted. The shape and size of the silver particles 13 illustrated in FIGS. 4 and 5 may be different from the shape and size of actual silver particles.

The third electrode layer E3 is formed on the second electrode layer E2 through a plating method. In the multilayer capacitor C1, the third electrode layer E3 is formed on the second electrode layer E2 through copper-plating. The third electrode layer E3 includes a copper plating layer. The third electrode layer E3 includes copper. The metal included in the third electrode layer E3 is not limited to copper. The third electrode layer E3 may include a metal that volumetrically expand due to oxidation. The third electrode layer E3 covers the second electrode layer E2.

The fourth electrode layer E4 is formed on the third electrode layer E3 through a plating method. In the multilayer capacitor C1, the fourth electrode layer E4 is formed on the third electrode layer E3 through nickel-plating. The fourth electrode layer E4 includes a nickel plating layer. The fourth electrode layer E4 includes nickel. The nickel plating layer has better solder leach resistance than the silver particle 13 included in the second electrode layer E2. The fourth electrode layer E4 covers the third electrode layer E3. The fourth electrode layer E4 includes an other metal plating layer different from the third electrode layer E3.

The fifth electrode layer E5 is formed on the fourth electrode layer E4 through a plating method. The fifth electrode layer E5 includes a solder plating layer. In the multilayer capacitor C1, the fifth electrode layer E5 is formed on the fourth electrode layer E4 through tin-plating. The fifth electrode layer E5 includes a tin plating layer. The fifth electrode layer E5 includes tin (Sn). The fifth electrode layer E5 may include a tin-silver alloy (Sn—Ag) plating layer, a tin-bismuth alloy (Sn—Bi) plating layer, or a tin-copper alloy (Sn—Cu) plating layer. The fifth electrode layer E5 covers the fourth electrode layer E4. The fifth electrode layer E5 includes an other metal plating layer different from the third electrode layer E3.

The third electrode layer E3, the fourth electrode layer E4, and the fifth electrode layer E5 are included in a metal plating layer PL formed on the second electrode layer E2. That is, the external electrode 5 includes the metal plating layer PL, and the metal plating layer PL includes the third electrode layer E3, the fourth electrode layer E4, and the fifth electrode layer E5. The metal plating layer PL covers the second electrode layer E2. The third electrode layers E3 included in the electrode portions 5*a*, 5*c*, and 5*e* are formed integrally with each other. The fourth electrode layers E4 included in the electrode portions 5*a*, 5*c*, and 5*e* are formed integrally with each other. The fifth electrode layers E5 included in the electrode portions 5*a*, 5*c*, and 5*e* are formed integrally with each other.

The metal plating layer PL covering the second electrode layer E2 tends to be in close contact with the second electrode layer E2, but tends not to be in close contact with the element body 3. Therefore, the above-described gap is present between each end of the third electrode layer E3, the fourth electrode layer E4 and the fifth electrode layer E5 and the side surfaces 3*a* and 3*c*. The gap is present between each end of the third electrode layer E3, the fourth electrode layer E4 and the fifth electrode layer E5 and the ridge portion between the side surface 3*a* and the side surface 3*c*. An interval between each end of the third electrode layer E3, the fourth electrode layer E4, and the fifth electrode layer E5 and the side surfaces 3*a* and 3*c*, that is, a width of the above-described gap, is greater than 0 and equal to or less than 3 μm, for example. A width of the gap between each end of the third electrode layer E3, the fourth electrode layer E4 and the fifth electrode layer E5 and the ridge portion between the side surface 3*a* and the side surface 3*c* is, for example, greater than 0 and equal to or less than 3 μm. The widths of the gaps may be different for each of the third electrode layer E3, the fourth electrode layer E4, and the fifth electrode layer E5, or may be different for each of the side surface 3*a*, the side surface 3*c*, and the ridge portion between the side surface 3*a* and the side surface 3*c*.

As illustrated in FIGS. 4 and 5, the multilayer capacitor C1 includes a oxide 15. The oxide 15 is disposed in the gap between the third electrode layer E3 and the element body 3. That is, the oxide 15 is disposed in front of an edge of the second electrode layer E2. The oxide 15 is in contact with the end of the third electrode layer E3 and the element body 3. For example, the oxide 15 closes the gap between the third electrode layer E3 and the element body 3. A thickness of the oxide 15 is equivalent to the interval between the third electrode layers E3 and the element body 3. The width of the oxide 15 is, for example, equal to the thickness of the third electrode layer E3. The oxide 15 includes a portion 15*a* and a portion 15*c*. The oxide 15 may include, for example, an insulating layer.

The portion 15*a* is positioned on the side surface 3*a*. The portion 15*a* is in contact with the end of the third electrode layer E3 and the side surface 3*a* and is disposed in the gap between the end of the third electrode layer E3 and the side surface 3*a*. For example, the portion 15*a* closes the gap between the end of the third electrode layer E3 and the side surface 3*a*.

The portion 15*c* is positioned on the side surface 3*c*. The portion 15*c* is in contact with the end of the third electrode layer E3 and the side surface 3*c* and is disposed in the gap between the end of the third electrode layer E3 and the side surface 3*c*. For example, the portion 15*c* closes the gap between the end of the third electrode layer E3 and the side surface 3*c*.

The oxide 15 includes a portion positioned on the ridge portion between the side surface 3*a* and the side surface 3*c*. This portion is in contact with the end of the third electrode layer E3 and the ridge portion between the side surface 3*a* and the side surface 3*c* and is disposed in the gap between the end of the third electrode layer E3 and the ridge portion between the side surface 3*a* and the side surface 3*c*. For example, the portion positioned on the ridge portion between the side surface 3*a* and the side surface 3*c* closes the gap between the end of the third electrode layer E3 and the ridge portion between the side surface 3*a* and the side surface 3*c*.

As illustrated in FIG. 6, the portion 15*a* extends along an edge of the second electrode layer E2 of the electrode portion 5*a*. For example, the portion 15*a* extends continuously along the edge of the second electrode layer E2 of the electrode portion 5*a*. The portion 15*a* may be in contact with the second electrode layer E2 of the electrode portion 5*a* or may be separated from the second electrode layer E2 of the electrode portion 5*a*.

As illustrated in FIG. 7, the portion 15*c* extends along an edge of the second electrode layer E2 of the electrode portion 5*c*. For example, the portion 15*c* extends continuously along the edge of the second electrode layer E2 of the electrode portion 5*c*. The portion 15*c* may be in contact with the second electrode layer E2 of the electrode portion 5*c* or may be separated from the second electrode layer E2 of the electrode portion 5*c*.

The above-described portion positioned on the ridge portion between the side surface 3*a* and the side surface 3*c* extends along an edge of the second electrode layer E2 of the electrode portion on the ridge portion between the side surface 3*a* and the side surface 3*c*. For example, the above-described portion positioned on the ridge portion between the side surface 3*a* and the side surface 3*c* extends continuously along the edge of the second electrode layer E2 of the electrode portion on the ridge portion between the side surface 3*a* and the side surface 3*c*. The above-described portion positioned on the ridge portion between the side surface 3*a* and the side surface 3*c* may be in contact with the second electrode layer E2 of the electrode portion on the ridge portion between the side surface 3*a* and the side surface 3*c* or may be separated from the second electrode layer E2 of the electrode portion on the ridge portion between the side surface 3*a* and the side surface 3*c*.

FIGS. 6 and 7 are plan views illustrating the second electrode layer and the oxide.

The oxide 15 includes an oxide of a metal component included in the metal plating layer PL. In the multilayer capacitor C1, the oxide 15 includes an oxide of copper included in the third electrode layer E3. For example, the oxide 15 includes a copper oxide.

The oxide 15 is formed from, for example, heat treatment of the third electrode layer E3. In the heat treatment of the third electrode layer E3, for example, the following process proceeds.

An oxide of copper included in the third electrode layer E3 is formed on a surface of the end of the third electrode layer E3. The oxide of copper formed on the surface of the end of the third electrode layers E3 grows toward the element body 3 in the gap between the end of the third electrode layers E3 and the element body 3. The oxide of copper that grows in the gap between the end of the third electrode layer E3 and the element body 3 grows until coming into contact with the element body 3. Conditions for the heat treatment of the third electrode layer E3 include, for example, heating temperature or heating time.

The heat treatment of the third electrode layer E3 may be performed after forming the fourth electrode layer E4 and before forming the fifth electrode layer E5. In this case, an oxide of nickel included in the fourth electrode layer E4 may be formed on a surface of the end of the fourth electrode layer E4. Nickel oxide tends to form a passive film and tends not to grow than copper oxide. Therefore, the gap tends to be present between the fourth electrode layer E4 and the element body 3.

The heat treatment of the third electrode layer E3 may be performed after forming the fifth electrode layer E5. In this case, an oxide of metal included in the fifth electrode layer E5, for example, an oxide of tin, may be formed on a surface of the end of the fifth electrode layer E5. The oxide of tin tends to form a passive film and tends not to grow than copper oxide. Therefore, the gap tends to be present between the fifth electrode layer E5 and the element body 3.

In the multilayer capacitor C1 the oxide 15 is in contact with the metal plating layer PL and the element body 3 and is disposed in the gap between the metal plating layer PL and the element body 3. Therefore, even when silver (Ag) migration occurs in the second electrode layer E2, progress of silver migration is prevented. The multilayer capacitor C1 prevents the progress of silver migration on the element body 3.

The oxide 15 includes the oxide of the metal component included in the metal plating layer PL. Therefore, in the multilayer capacitor C1, the oxide 15 is reliably disposed in the gap between the metal plating layer PL and the element body 3.

In the multilayer capacitor C1, the metal plating layer PL includes the third electrode layer E3. The oxide 15 includes the oxide of copper included in the third electrode layer E3.

In the multilayer capacitor C1, for example, the oxide 15 may be formed from heat treating the third electrode layer E3. Therefore, the oxide 15 is easily disposed.

In the multilayer capacitor C1, the metal plating layer PL includes the fourth electrode layer E4. The fourth electrode layer E4 includes the other metal plating layer different from the third electrode layer E3.

The fourth electrode layer E4 has the gap between the fourth electrode layer E4 and the element body 3. Heat tends to act on the third electrode layer E3 through the gap between the fourth electrode layer E4 and the element body 3 when heat-treating the third electrode layer E3, for example. Therefore, even in the configuration in which the metal plating layer PL includes the fourth electrode layer E4, the oxide 15 may be easily and reliably disposed.

In the multilayer capacitor C1, the metal plating layer PL includes the fourth electrode layer E4.

The fourth electrode layer E4 prevents solder leaching when solder-mounting.

In the multilayer capacitor C1, the metal plating layer PL includes the fifth electrode layer E5.

The fifth electrode layer E5 improves solder-mountability of the multilayer capacitor C1.

In the multilayer capacitor C1, the metal plating layer PL includes the fifth electrode layer E5. The fifth electrode layer E5 includes the other metal plating layer different from the third electrode layer E3.

The fifth electrode layer E5 has the gap between the fifth electrode layer E5 and the element body 3. Heat tends to act on the third electrode layer E3 through the gap between the fifth electrode layer E5 and the element body 3 when heat-treating the third electrode layer E3, for example. Therefore, even in the configuration in which the metal plating layer PL includes the fifth electrode layer E5, the oxide 15 may be easily and reliably disposed.

In the multilayer capacitor C1, the oxide 15 extends along the edge of the second electrode layer E2. Therefore, the multilayer capacitor C1 reliably prevents the progress of silver migration.

In the present specification, in a case where an element is described as being disposed on another element, the element may be directly disposed on the other element or be indirectly disposed on the other element. In a case where an element is indirectly disposed on another element, an intervening element is present between the element and the other element. In a case where an element is directly disposed on another element, no intervening element is present between the element and the other element.

In the present specification, in a case where an element is described as being positioned on another element, the element may be directly positioned on the other element or be indirectly positioned on the other element. In a case where an element is indirectly positioned on another element, an intervening element is present between the element and the other element. In a case where an element is directly positioned on another element, no intervening element is present between the element and the other element.

In the present specification, in a case where an element is described as covering another element, the element may directly cover the other element or indirectly cover the other element. In a case where an element indirectly covers another element, an intervening element is present between the element and the other element. In a case where an element directly covers another element, no intervening element is present between the element and the other element.

It is to be understood that not all aspects, advantages and features described herein may necessarily be achieved by, or included in, any one particular example. Indeed, having described and illustrated various examples herein, it should be apparent that other examples may be modified in arrangement and detail.

Figure 8:
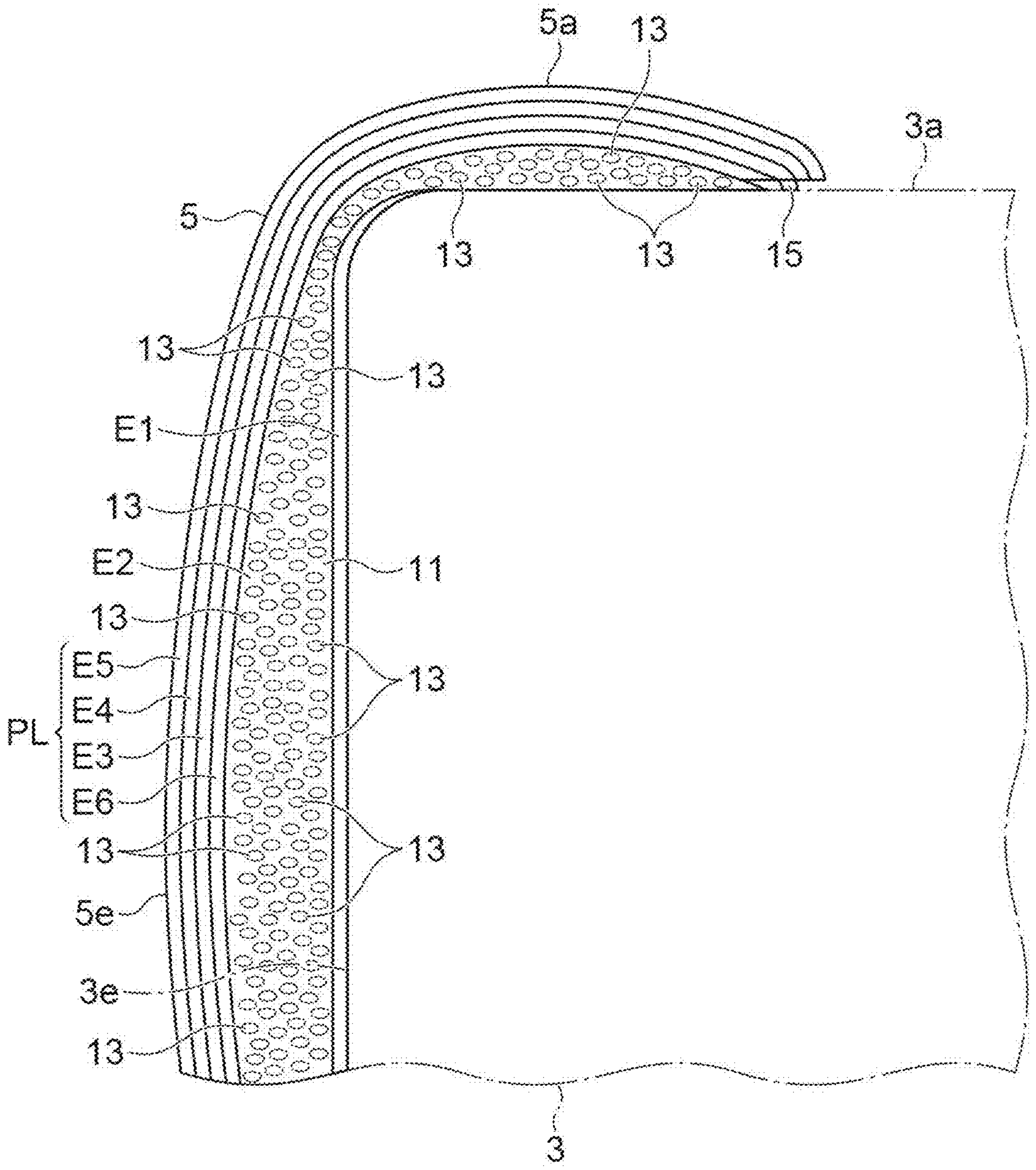
FIG. 8 is a view illustrating a cross-sectional configuration of an external electrode.
Figure 9:
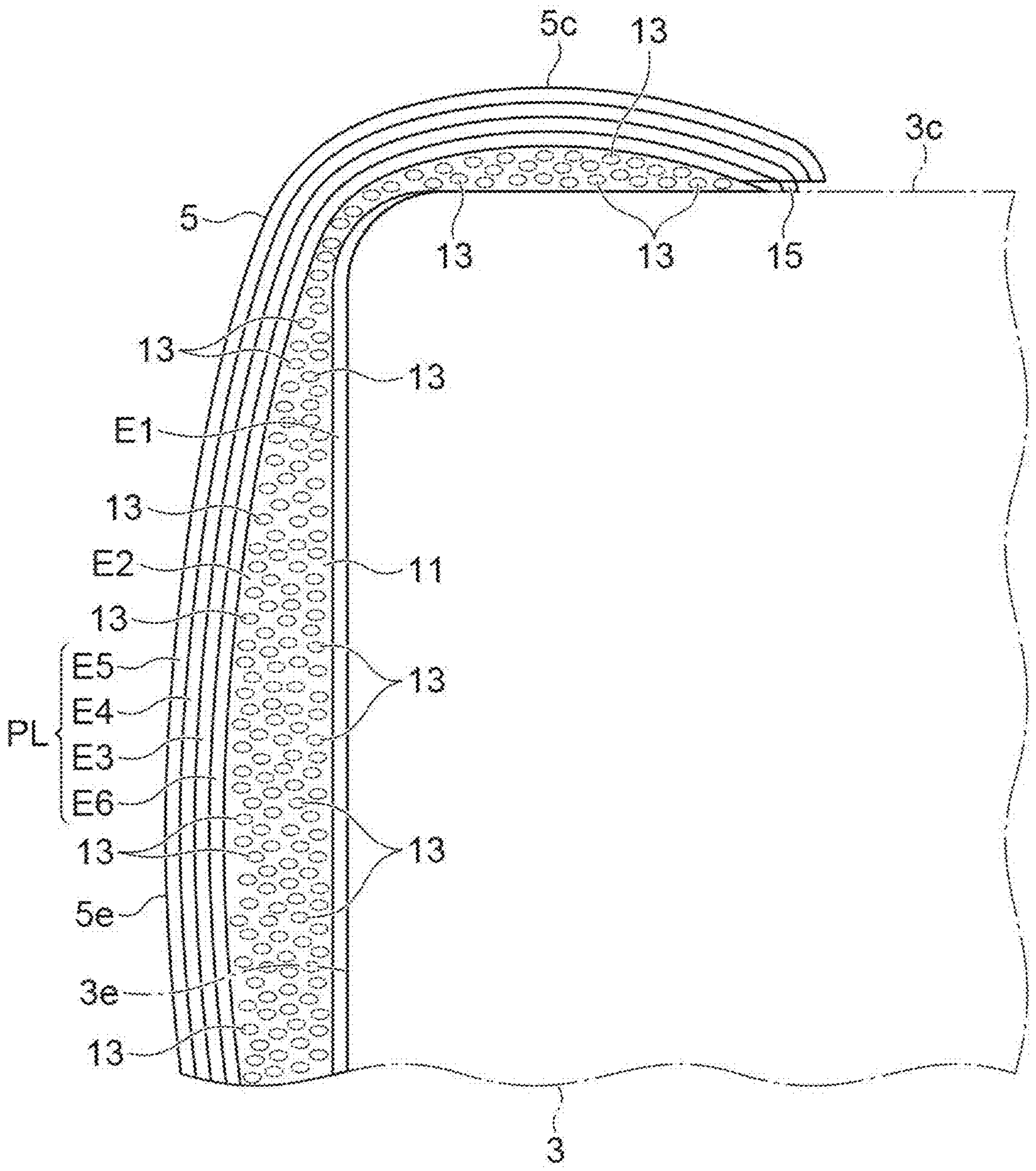
FIG. 9 is a view illustrating a cross-sectional configuration of the external electrode.

As illustrated in FIGS. 8 and 9, the metal plating layer PL may include a sixth electrode layer E6 positioned between the second electrode layer E2 and the third electrode layer E3. That is, the electrode portions 5*a*, 5*c*, and 5*e* and the electrode portion between the side surface 3*a* and the side surface 3*c* may include the sixth electrode layer E6. FIGS. 8 and 9 are views illustrating a cross-sectional configuration of an external electrode. FIGS. 8 and 9 schematically illustrate a cross-sectional configuration of the external electrode 5. In FIGS. 8 and 9, hatching indicating a cross section is omitted. The shape and size of the silver particles 13 illustrated in FIGS. 8 and 9 may be different from the shape and size of actual silver particles.

In a configuration in which the metal plating layer PL includes the sixth electrode layer E6, the sixth electrode layer E6 is disposed on the second electrode layer E2. The sixth electrode layer E6 covers the second electrode layer E2. The sixth electrode layer E6 is in contact with the second electrode layer E2. The sixth electrode layer E6 is in direct contact with the second electrode layer E2.

The third electrode layer E3 is disposed on the sixth electrode layer E6. The third electrode layer E3 is disposed outside the second electrode layer E2. The third electrode layer E3 covers the sixth electrode layer E6. The third electrode layer E3 is in contact with the sixth electrode layer E6. The third electrode layer E3 is in direct contact with the sixth electrode layer E6. The third electrode layer E3 is formed on the sixth electrode layer E6 through the plating method.

The sixth electrode layer E6 is formed on the second electrode layer E2 through a plating method. The fourth electrode layer E4 is formed on the second electrode layer E2 through nickel-plating, for example. The sixth electrode layer E6 includes a nickel plating layer.

A gap is present between an end of the sixth electrode layer E6 and the element body 3 in the same manner as between the end of each of the third electrode layer E3, the fourth electrode layer E4, and the fifth electrode layer E5 and the element body 3. That is, the gap is present between the edge of the sixth electrode layer E6 and the side surfaces 3*a* and 3*c* and between the edge of the sixth electrode layer E6 and the ridge portion between the side surface 3*a* and the side surface 3*c*. An interval between the end of the sixth electrode layer E6 and the side surfaces 3*a* and 3*c*, that is, a width of the above-described gap, is greater than 0 and equal to or less than 3 μm, for example. A width of the gap between the end of the sixth electrode layer E6 and the ridge portion between the side surface 3*a* and the side surface 3*c* is, for example, greater than 0 and equal to or less than 3 μm.

The width of the gap between the end of the sixth electrode layer E6 and the element body 3 may be the same as or different from the width of the gap between each end of the third electrode layer E3, the fourth electrode layer E4, and the fifth electrode layer E5 and the element body 3. The width of the gap between the end of the sixth electrode layer E6 and the side surface 3*a*, the width of the gap between the end of the sixth electrode layer E6 and the side surface 3*c*, and the width of the gap between the end of the sixth electrode layer E6 and the ridge portion between the side surface 3*a* and the side surface 3*c* may be the same as or different from each other.

In the present examples and modified examples, the electronic component includes the multilayer capacitor. However, applicable electronic component is not limited to the multilayer capacitor. The applicable electronic component includes, for example, a multilayer electronic component such as a multilayer inductor, a multilayer varistor, a multilayer piezoelectric actuator, a multilayer thermistor, a multilayer solid-state battery component, or a multilayer composite component, or electronic components other than the multilayer electronic components.

What is claimed is:

1. An electronic component comprising:
an element body;
an external electrode including a conductive resin layer including a plurality of silver particles and a metal plating layer disposed outside the conductive resin layer with a first gap between the metal plating layer and the element body and a second gap between the metal plating layer and the element body, the external electrode being disposed on the element body; and
an oxide of a metal component included in the metal plating layer, the oxide being in contact with the metal plating layer and the element body and being disposed in the first gap between the metal plating layer and the element body and in the second gap between the metal plating layer and the element body,
wherein the first gap and the second gap are respectively formed at opposite faces of the metal plating layer.

2. The electronic component according to claim 1, wherein
the metal plating layer includes a copper plating layer, and
the oxide includes an oxide of copper included in the copper plating layer.

3. The electronic component according to claim 2, wherein
the metal plating layer includes an other metal plating layer different from the copper plating layer, the other metal plating layer being disposed outside the copper plating layer with a gap between the other metal plating layer and the element body.

4. The electronic component according to claim 3, wherein
the other metal plating layer includes a nickel plating layer.

5. The electronic component according to claim 4, wherein
the other metal plating layer includes a solder plating layer outside the nickel plating layer.

6. The electronic component according to claim 5, wherein
the solder plating layer has a gap between the solder plating layer and the element body.

7. The electronic component according to claim 1, wherein
the oxide extends along an edge of the conductive resin layer.

8. An electronic component, comprising:
an element body;
an external electrode disposed on the element body and including a conductive resin layer including a plurality of silver particles; and
a first oxide disposed in front of an edge of the conductive resin layer and in contact with the element body and a second oxide disposed in front of another edge of the conductive resin layer and in contact with the element body, wherein
the external electrode includes a metal plating layer outside the conductive resin layer,
the first oxide and the second oxide are respectively formed at opposite faces of the metal plating layer, and
the first oxide and the second oxide each include an oxide of a metal component included in the metal plating layer.

9. The electronic component according to claim 8, wherein
the first oxide extends along the edge of the conductive resin layer, and the second oxide extends along the another edge of the conductive resin layer.

10. The electronic component according to claim 8, wherein
the metal plating layer includes a copper plating layer, and
the first oxide and the second oxide each include an oxide of copper included in the copper plating layer.

11. The electronic component according to claim 10, wherein the metal plating layer includes an other metal plating layer different from the copper plating layer, the other metal plating layer being disposed outside the copper plating layer.

12. The electronic component according to claim 11, wherein the other metal plating layer includes a nickel plating layer.

13. The electronic component according to claim 12, wherein the other metal plating layer includes a solder plating layer outside the nickel plating layer.

14. The electronic component according to claim 8, wherein the metal plating layer is separated from the element body, and the first oxide and the second oxide are each disposed between the metal plating layer and the element body.

15. An electronic component comprising:

an element body;

an external electrode including a conductive resin layer including a plurality of silver particles and a metal plating layer disposed outside the conductive resin layer with a gap between the metal plating layer and the element body, the external electrode being disposed on the element body; and an oxide of a metal component included in the metal plating layer, the oxide being in contact with the metal plating layer and the element body and being disposed in the gap between the metal plating layer and the element body, wherein the oxide extends continuously along an exposed edge of the conductive resin layer and the oxide extends continuously along the metal plating layer, the conductive resin layer, and the element body.

16. The electronic component according to claim 15, wherein the metal plating layer includes a copper plating layer, and the oxide includes an oxide of copper included in the copper plating layer.

17. The electronic component according to claim 16, wherein the metal plating layer includes an other metal plating layer different from the copper plating layer, the other metal plating layer being disposed outside the copper plating layer with a gap between the other metal plating layer and the element body.

18. The electronic component according to claim 17, wherein the other metal plating layer includes a nickel plating layer.

19. The electronic component according to claim 18, wherein the other metal plating layer includes a solder plating layer outside the nickel plating layer.

20. The electronic component according to claim 19, wherein the solder plating layer has a gap between the solder plating layer and the element body.

21. The electronic component according to claim 15, wherein the gap between the metal plating layer and the element body includes a first gap and a second gap, and the first gap and the second gap are respectively formed at opposite faces of the metal plating layer.

* * * * *